Oct. 8, 1946.          W. J. MILLER          2,408,803
APPARATUS FOR PREPARING CLAY FOR JIGGERING
IN THE MANUFACTURE OF POTTERYWARE
Original Filed Oct. 6, 1941     2 Sheets-Sheet 2

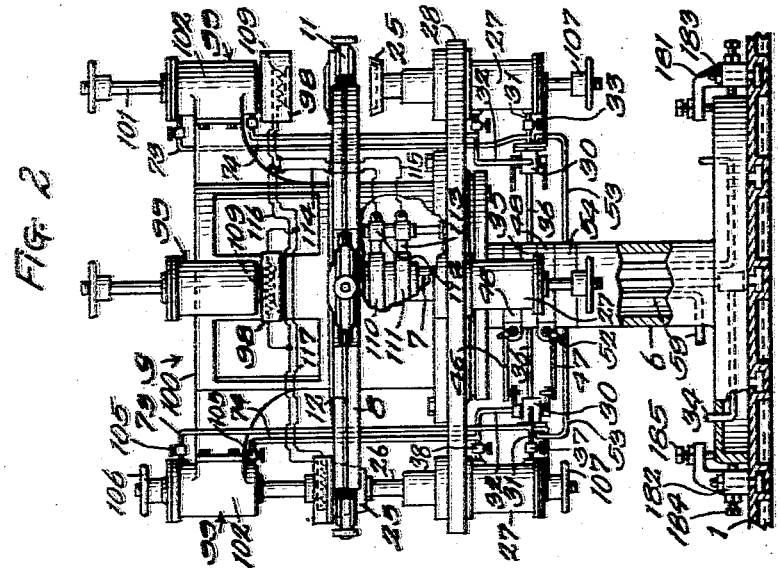

INVENTOR
WILLIAM J. MILLER
BY George J. Cominger
ATTORNEY

Patented Oct. 8, 1946

2,408,803

UNITED STATES PATENT OFFICE 2,408,803

APPARATUS FOR PREPARING CLAY FOR JIGGERING IN THE MANUFACTURE OF POTTERYWARE

William J. Miller, Swissvale, Pa., assignor to Miller Pottery Engineering Company, Swissvale, Pittsburgh, Pa., a corporation of Pennsylvania Original application October 6, 1941, Serial No. 413,734. Divided and this application September 22, 1943, Serial No. 503,376

26 Claims. (Cl. 25—22)

This application is a division of my co-pending application Serial No. 413,734 filed October 6, 1941.

This invention relates to Apparatus for manufacturing potteryware. It has to do with the production of jiggered ware, such as plates, cups and saucers and the like, from plastic clay on absorbent molds.

This application has to do particularly with apparatus for pressing and spreading clay charges over the molding surface of pottery jigger molds.

According to the present invention, the molds are moved in single file along a predetermined path and at locations spaced along said path, clay is fed to the molds and formed thereon, all whilst the molds are in continuous motion. The ware is thereafter dried and the molds returned for refilling.

One object of this invention is to provide a system and apparatus wherein productive operation is on a continuous and not intermittent scale, and to increase production capacity and speeds.

Another object is to provide for a wide range of production diversification whereby, due to this feature or the high speed feature, or both, the system will be highly adaptable to the high form diversity requirements of small potteries and the low form diversity high speed requirements of large potteries making a more standardized production.

Another object is to produce ware of excellent quality and appearance with a very low percentage of rejects or loss and in this connection, I have provided for ample periods of time to perform necessary operations properly and according to best practice.

In the drawings:

Fig. 1 is a diagrammatic illustration of the machine as seen in plan.

Fig. 2 is a side elevation of the clay preforming organization of the machine, with certain parts broken away and seen in section, and as viewed from the section line 2—2 of Fig. 1.

Fig. 3 is an enlarged sectional detail of certain parts of the apparatus.

Fig. 4 is a plan view of parts seen in Fig. 6.

Fig. 5 is an enlarged detail plan section of valve actuating mechanism.

Fig. 6 is a sectional view taken on the section line 6—6 of Fig. 5.

As diagrammatically seen in Fig. 1, the machinery has a base 1, upon which are mounted the machines for performing the various operations. Said machines include a mold charging machine 2, a preforming machine 3, and a jiggering machine 4, and if desired, an additional jiggering machine 5 for purposes to be later described. Each machine has a stationary pedestal 6, a hollow center shaft 7 and a rotatable table 8, having semi-circular peripheral sockets 9 and a peripheral groove 10 for receiving and supporting the mold supporting rings 11 and inter-connecting cable sections 12, which together, form an endless conveyor for the transportation of molds.

The conveyor which moves continuously is arranged in a horizontal plane and is also looped around a sprocket-like drive member 13 driven by motor 165 and an idler 14 each provided with sockets 9 and peripheral cable grooves 10.

In regard to the location and arrangement of these machines, it has been stated hereinbefore that ample time is to be provided for properly performing the various operations mentioned. The optimum time interval for each operation will be that which in practice is indicated to be correct for each operation. Once these requirements are determined, the other factors, such as the amount of conveyor in association with each table, the diameter of the table, the speed of rotation thereof and the speed of travel of the conveyor can be determined.

For illustrative purposes, it will be assumed herein that the jiggering operation requires the longest interval of time to complete, as it normally does. The pressing or preforming operation takes the least time and the feeding operation requires about the same length of time as preforming. Thus, the machines are so arranged that for feeding, the conveyor is associated with the table of machine 2 for about 90° and for pressing or preforming the conveyor is associated with the table of machine 3 for about 45°.

The organized machine 3 is capable of pressing bats or blanks for round jiggered pottery dinner ware, such as plates, cups and saucers and the like. Production may be diversified, if desired, and various types and forms of ware made in succession as illustrated by molds 16, 17, 18, and 19, representing both hollow ware and flat ware types. The maximum range of product diversification at any one time is herein illustrated, for example, as four and the molds therefore are arranged on the conveyor in sets of four, the molds of each set in the entire conveyor circuit corresponding to all other sets as to position, type, capacity, etc. A sample production set-up would be (1) a dinner plate, (2) cup, (3) saucer and (4) bowl and all the machinery would be adapted throughout to accommodate this production which would involve proper dies, chucks, mold seats, operational adjustment and replacement of dies, chucks and other parts depending on the size of the molds and the type of ware involved.

With reference to the mold conveyor, the mold supports 11 have two rollers 20 adapted to ride upon track sections 21 and to be received freely within vertical notches 22, Fig. 4, of table 8 when the supports are associated with the sockets 9. The supports are held firmly level in vertical location in the sockets by the outwardly tapered peripheral tongue 23 within correlatively formed groove portions 24 in the side walls of sockets 9, Fig. 3, and when in such association, the mold registers with a mold lifter or chuck 25 therebelow and bat forming equipment thereabove. The mold lifters and the bat forming apparatus are herein shown as actuated by fluid motors, all substantially similar in construction and operation.

The mold chucks 25 are mounted on the top ends of vertical pistons 26 of piston and cylinder type fluid pressure-operated motors 27 secured to the rotatable tables 28 of the machine. Each piston rod preferably has a vacuum conduit 26a, connected to a vacuum hose 26b for intermittently vacuumizing the mold chucks 25 of the machines. Generally, the motors 27 are operated to raise and lower the molds in timed relation with the movement of the conveyor, by the motors 27 being alternately connected with a suitable source of fluid under pressure, by way of an automatically operated four-way control valve 30, Fig. 6, cooperating between conduits 31 and 32, leading from the ends of the cylinder and a supply conduit system leading to said source. The valves 30 are supported by brackets 33 on the cylinder housings.

The piping system of the preforming machine includes a central stationary conduit 34 inside the pedestal, leading from a pump (not shown) to an interiorly grooved hollow ring-like distributor head 35 rotatable on the pedestal and connected to the valves 30, through pipes 36. Pipes 31 and 32 to the motors 27 have manually operated control valves 37 and 38 respectively to control the rate of flow of fluid to the motors 27 in regulating the speed of movement of the mold chucks to raised and lowered positions.

The valves 30 and the means for automatically operating same are described in Patent 2,293,070. As shown in Figs. 5 and 6, the valves 30 are of the oscillating four-way type, each having an upright cylindrical valve-casing 39 through which the conduits 31 and 32 are alternately connected to conduit 36 by an oscillating plug type valve member 40 which is oscillated by two cam levers 41 and 42 on the shaft 43, which during rotation of the table 28 are successively engaged by cam pins 44 and 45 on the ends, respectively of stationary cam arms 47 and 46 adjustably mounted on the pedestal 6 of each machine. Each arm has at its inner end, an internally grooved hub 48 within which is disposed a ring gear 49 secured on the pedestal and meshing with a worm 50 on a shaft 51 mounted in bearings of the hub. A hand-crank 52 on the shaft 51 is for rotating the worm to adjust the arms about the axis of the pedestal. The hubs 48 of the arms are arranged on opposite sides of the distributor-ring 35 to support same in vertical position on the pedestal.

Each valve 30 has a vent pipe 53, leading to a distributor 54 similar to distributor 35 and the outlet side of this distributor is connected by pipe 59 to a suitable source of supply.

In that the molds for producing the various articles only vary as to the shape and depth of the molding surfaces thereof, and are well-known in the art, it is considered sufficient to mention that the mold chucks for cooperating with same vary in depth of cavity and range of reciprocation accordingly in raising same out of the carriers.

With regard to the preforming machine 3, Fig. 2, to which the molds are transported after leaving the charging device, 98 are clay pressing dies arranged above the sockets 9 of table 1 of this machine in coaxial alignment with the chucks 25 therebelow, the dies being mounted for vertical reciprocation to cooperate with the molds supported by the chucks in pressing or preforming the clay charges thereon into the desired shapes. The dies are reciprocated, respectively, by fluid pressure operated cylinder and piston type motors 99 arranged thereabove and mounted on the sides of a cylindrical bracket 100 arranged centrally on the table 8, each motor having a depending piston rod 101 at the lower end of which its respective, suitably shaped die is secured. Each die motor 99 is operated to lower its die 98, upon the raising of a mold by the chuck therebelow, into cooperative relation therewith. The piston chamber of motor 99 is connected to pipes 73 and 74 to establish control thereof by valve 30. In each of said conduits 73 and 74 is a throttle valve 105 to control the flow of the fluid into the die motors in regulating the speed of movement of the dies relative to the chucks. The thickness to which the charge is compressed may be regulated, whilst in operation, if the table is rotating slow enough, by nuts 106 and 107. As the dies function more efficiently when heated, each is provided with an electric heating element 109 within the hollow interior thereof. During rotation of the dies with the table 8, the heating coils thereof are maintained in connection with suitable electric power lines by way of contact rings 110 and 111 on the central shaft 7 of the machine. These rings cooperate with contacts 112 and 113 supported on the turret and from which lead conductors 114 and 115 connected with the terminals of the heating coils through branch conductors 116 and 117.

After being charged with clay, a mold is carried by the conveyor to the turntable which includes a multiple of preformers each adapted to successively register with molds disposed on the conveying means, whilst the conveying means and turntable are in motion as mentioned with regard to the feeder tables. The function of the preformer is to press and spread the plastic clay over the molding surface in order to form a blank of suitable thickness and diameter or height, depending on the flat or hollow character of the mold, for jiggering. The blank may be spread to the full diameter of the ware forming surface of the mold or to a degree less than the full diameter of the ware forming surface in which case the profile tool would complete the work of spreading incident to jiggering. After the blank has been formed, the mold, which has been continuously conveyed up to this point, moves on to the jigger and comes into registry with a profile tool.

With regard to Fig. 1, the base of the machine is criss-crossed with T slots 180 in which are received the heads of inverted bolts 181 extending upwardly through holes in base clamps 182 and being secured thereto by nuts 183. The clamps have horizontal adjustment screws 184 for making minor adjustment in the location of the machines and vertical hold-down screws 185 for clamping the machine base to the floor. Any major adjustment in the location of the preformer can be quickly and easily accomplished by removing the clamps 182 and shifting the machine to the desired location.

While I have shown the preferred form of conveyor as comprising ring seats connected by cable sections, it will be understood that other forms of conveyor may be equally adaptable, such as, for instance, a chain conveyor or the like. It will also be understood that the preformer may be driven by independent sprocket and chain in which event the mold conveyor would not be employed for the purpose of driving the machines as well as conveying the molds.

By virtue of the foregoing invention, it will be observed that I have provided a method or system wherein a mold is carried with sustained forward movement in one path and a performing implement is carried with sustained forward movement in another, and different, orbital path and in a portion of there respective paths the mold and implement are brought into registration and preforming cooperation. The molds in this case are transported in a tortuous path and in the curved portions of the path is located the preforming machine on an adjustable base. The length of the curved portions of the path, or rather the amount of conveyor in association with the table of the machine determines the time available for the performance of the operation on the mold by the preforming implements of the machine. Obviously, variations in the time of the preforming can be obtained by varying the position of the machine relative to the conveyor. The instant of initiation of the preforming operation, the duration and endpoint of such operation is of course controlled by and variable by means of the valves in the fluid system.

In case it is desired to rotate the chucks of the machine, the piston rod 26 upon which each chuck is mounted may extend through in sliding key connection with the hollow shaft 135 of an electric motor 136 interposed between the chuck and the fluid pressure motor 137 thereof. The motors 136, Fig. 4, are suspended below table 28 with the fluid pressure motors secured onto their bottom ends, as seen in Fig. 4. Each electric motor 136 has top and bottom end walls 138 and 139 in which are bearings 140 and 141 supporting the ends of the motor shaft with the upper bearing continuing upward into a bearing portion 142 within which the piston 143 is supported.

The electric motors 136 are energized to rotate the chucks when raised, by each motor being connected with any suitable electric power lines, during a given portion of each revolution of the table 8, by way of arcuate segmental contacts 144 and 145 on the shaft 7 of the device, cooperating with wiper contacts 146 and 147 arranged and connecting with the terminals of the motors through conductors 148 and 149.

To reduce the load on the electric motor 136 to a minimum, the piston 26 of the fluid pressure motors 27 therebelow are arranged on the piston rods of the motors to be relatively rotatable with respect thereto, wherein there are two collars 152 arranged on the rods between which the pistons are held in position.

I claim:

1. In combination, a mold for forming pottery, a carrier therefor, means for moving the carrier and mold with sustained forward motion in a path wherein clay is preformed on the molding surface of the mold, a preformer, a support therefor, means for moving the support and preformer in another, and different, orbital path with sustained forward movement to bring the mold and preformer into registration and means for moving the preformer and mold relative to one another to effect a preforming operation.

2. The combination with a flexible conveyer for continuously advancing a line of pottery molds along a generally horizontal path wherein clay is preformed on said molds of a traveling preformer thereabove arranged to rotate continuously about a given axis into and out of register with successive molds, means for rotating said preformer as aforesaid and means for effecting relative movement between said preformer and mold when in register to effect a preforming operation.

3. In combination, potteryware batting out apparatus having a turntable associated therewith rotatable about a vertical axis, batting out dies above said table rotatable therewith about said axis, endless flexible mold conveying means looped about said turntable, pottery molds mounted on said conveying means to be carried thereby to said turntable and transported about said axis in register with said batting out implements thereabove, means for effecting relative movement between said batting out dies and molds when in register to perform batting out operations and means operable to continuously drive said conveying means and turntable.

4. Apparatus for preparing for jiggering the plastic ceramic material applied to pottery jigger molds comprising, a horizontal support provided with spaced recesses therethrough for receiving mold supports, means for continuously rotating said support, means above and in register with said recesses and continuously rotatable about the axis of said support for pressing plastic ceramic material on the molding surface of molds therebelow, a plurality of mold carrying members and an endless, continuously traveling conveyer carrying said members horizontally into interfitting relation with said recesses, whereby successive molds are indexed with successive pressing means to have the plastic ceramic material thereon prepared for jiggering.

5. Apparatus for preparing for jiggering the plastic ceramic material applied to pottery jigger molds comprising, a horizontal support provided with spaced recesses therethrough for receiving mold supports, means for rotating said support, means movable with and above and in register with said recesses and rotatable about the axis of said support therewith for pressing plastic ceramic material on the molding surface of molds therebelow, a plurality of mold carrying members and means for moving said members horizontally into interfitting relation with said recesses whereby successive molds are indexed with successive pressing means to have the plastic ceramic material thereon prepared for jiggering.

6. Apparatus for preparing for jiggering the plastic ceramic material applied to pottery jigger molds which comprises, a horizontal support provided with spaced recesses therethrough for receiving mold supports, means for rotating said support, means movable with and mounted above and in register with said recesses for pressing plastic ceramic material on molds therebelow, a plurality of mold carrying members, means for moving said members horizontally into seated relation with said recesses to be rotated therewith and means for causing relative movement between said molds and pressing means when in register to prepare the plastic ceramic material on the molding surface of said molds for jiggering.

7. Apparatus for preparing for jiggering the plastic ceramic material applied to pottery jigger molds which comprises, a horizontal support provided with spaced recesses therethrough for receiving mold supports, means for rotating said support, means movable with and mounted above and in register with said recesses for pressing plastic ceramic material on the molding surface of molds therebelow, a plurality of mold carrying members, means for moving said members horizontally into seated relation with said recesses to be rotated therewith and guide means adjacent said last named means for guiding said mold supports into said recesses.

8. Apparatus for preparing for jiggering the plastic ceramic material applied to pottery jigger molds which comprises, a horizontal support provided with spaced recesses therethrough for receiving mold supports, means for rotating said support, means movable with and mounted above and in register with said recesses for pressing plastic ceramic material on the molding surface of molds therebelow, a plurality of mold carrying members, means for moving said members horizontally into seated relation with said recesses and stationary means beside said last named means and adjacent said horizontal support for undersupporting said mold carrying members when in associated relation with said recesses.

9. Apparatus for preparing for jiggering plastic ceramic material applied to pottery jigger molds which comprises, a rotatable, horizontal table provided with circumferentially spaced recesses for receiving mold supports, means movable with and mounted above and in register with said recesses for pressing plastic ceramic material on the molding surface of molds therebelow, an endless mold carrying member in driving association with said table, mold supports carried by said members to be received in said recesses and carried therewith and means for relatively moving said pressing means and molds when in register to effect the preparation of the plastic ceramic material on said molds for jiggering.

10. Apparatus for preparing plastic ceramic material applied to pottery jigger molds for jiggering which comprises, a horizontal support provided with spaced recesses, a pressing die mounted above and in register with each recess, and an endless mold conveyer having mold carrying members attached thereto formed to fit said recesses and to be received thereby.

11. Apparatus for preparing the plastic ceramic material applied to pottery jigger molds for jiggering which comprises, a traveling mold support carrier, a traveling implement for preparing plastic ceramic material for jiggering thereabove and in register therewith and movable relative thereto and an endless flexible conveyor having mold supports formed to fit said mold support carrier, said mold support carrier arranged to receive successive mold supports and transport the same for a predetermined distance whilst the plastic ceramic material thereon is prepared for jiggering.

12. Apparatus for preparing the plastic ceramic material applied to pottery jigger molds for jiggering which comprises, a traveling mold support carrier, a traveling reciprocable die mounted thereabove and in register therewith, a continuously moving mold conveyor provided with mold supporting members arranged to be received by said carrier and transported therewith, and means for moving said die relative to said members when in associated relation with said carrier.

13. Apparatus for preparing the plastic ceramic material applied to pottery jigger molds for jiggering which comprises, a traveling mold support carrier, a traveling die mounted thereabove, a continuously moving mold conveyor provided with mold supporting members arranged to be received by said carrier and transported therewith, a traveling mold lifter below said carrier and means for elevating and lowering said lifter during the interval of association of said mold carrier and mold support carrier.

14. Apparatus for preparing plastic ceramic material applied to jigger molds for jiggering which comprises, a traveling mold support carrier, a reciprocable die thereabove, a traveling mold support to be intermittently received and transported by said mold support carrier, a traveling mold lifter below said mold support carrier and means operable to relatively move said mold lifter and said die during the interval of association of the mold support with the mold support carrier whereby the material carried by the mold is acted upon and prepared for jiggering.

15. Apparatus for preparing plastic ceramic material applied to jigger molds for jiggering which comprises, a rotatable table having peripheral recesses therein for receiving mold supports, a reciprocable die mounted above and in register with each recess, a mold lifter below each recess, an endless conveyer having mold supports formed to seat in said recesses, means for continuously driving said conveyer and table and means for activating said dies and mold lifters during the period a mold support is seated in the recess associated with the die and mold lifter to thereby prepare the plastic ceramic material on the molding surface of the mold carried by the mold support for jiggering.

16. Apparatus for preparing plastic ceramic material applied to jigger molds for jiggering which comprises, a continuously moving support for molds for carrying them through a fabricating zone, pressing implements thereabove and movable therewith in said zone for acting on plastic ceramic material carried by said molds, and a continuously traveling, endless mold conveyer formed for depositing molds with plastic ceramic material to be acted upon on said support and for removing molds with pressed plastic ceramic material thereon from said support while said support is in motion.

17. Apparatus for preparing plastic ceramic material applied to jigger molds for jiggering which comprises, a rotatable table having circumferential recesses formed to receive mold supports, a contoured die above and in register with each recess, means for rendering said die nonadhesive to the plastic ceramic material mold supporting members formed to seat in said recesses, means for transporting said members to and from said recesses and means operable to effect relative movement between the molds and dies when in register to press plastic ceramic material on the surface of said molds.

18. Apparatus for manufacturing dinnerware and the like comprising a continuously moving support for carrying mold carriers through a fabricating zone, means for preforming ware in said zone, and a continuously traveling, endless mold conveyor having mold carriers formed and positioned for meshing with said support.

19. Apparatus for manufacturing dinnerware and the like comprising a rotatable support for carrying mold carriers through a fabricating zone, means for preforming ware in said zone and a traveling, endless mold conveyor having mold carriers formed and positioned for meshing with said support.

20. Apparatus for manufacturing dinnerware and the like comprising a rotatable support for carrying mold carriers through a fabricating zone, said support having peripheral recesses for receiving mold carriers, means for preforming ware in said zone, and a traveling endless mold conveyor having mold carriers formed and positioned for entering the recesses of said support and becoming seated therein.

21. Apparatus for manufacturing dinnerware and the like comprising a support for carrying mold carriers in a curved path through a fabricating zone, a plurality of preforming members movable in a path concentric with the axis of the curved path for forming ware on molds carried by the carrier, and an endless, flexible conveyor arranged to travel around said support to carry molds to the fabricating zone and remove them therefrom.

22. Apparatus for manufacturing dinnerware and the like comprising a support for carrying mold carriers in a curved path through a fabricating zone, said support including a stationary track, a contoured pressing die for shaping clay, means for carrying said die in a path concentric with the axis of said mold support into and out of register with the molds therebelow, an endless conveyor arranged to travel around said support to carry molds to the fabricating zone and remove them therefrom, jigger molds carried by said conveyor and means for moving said pressing die and a mold relative to one another when in register to perform a shaping operation.

23. Apparatus for manufacturing dinnerware and the like comprising a support for carrying mold carriers in a curved path through a fabricating zone, said support including a stationary track and a rotatable member having recesses formed for receiving mold carriers, a contoured pressing die for shaping clay, means for carrying said die in a path concentric with the axis of said mold support into and out of register with molds therebelow, an endless conveyor arranged to travel around said support, said conveyor having mold carriers attached thereto, jigger molds carried by said carriers and means for moving said pressing die and a mold relative to one another when in register to perform a shaping operation.

24. Apparatus for manufacturing dinnerware and the like comprising a support for carrying mold carriers in a curved path through a fabricating zone, said support including a stationary track and a rotatable member having recesses formed for receiving mold carriers, a pressing die for shaping clay, means for carrying said pressing die in a path concentric with the axis of said mold support into and out of register with molds therebelow, an endless conveyor arranged to travel around said support, said conveyor having mold carriers provided with rollable elements attached thereto engageable with the support, jigger molds carried by said carriers and means for moving said pressing die and a mold relative to one another when in register to perform a shaping operation.

25. Apparatus for manufacturing dinnerware and the like comprising a rotatable support for carrying molds through a fabricating zone, an angularly moving preformer in said zone for shaping clay on molds, and a traveling endless mold conveyor formed for depositing empty molds on said support and removing loaded molds therefrom and carrying them away.

26. Apparatus for manufacturing dinnerware and the like comprising a continuously moving support for molds for carrying them through a fabricating zone, an angularly moving preformer in said zone for shaping clay on the molds and a continuously traveling endless mold conveyor former for depositing empty molds upon said support and removing loaded molds therefrom.

WILLIAM J. MILLER.